(Model.)
S. LYMAN.
PUZZLE CARD FOR OBJECT TEACHING.
No. 274,799. Patented Mar. 27, 1883.
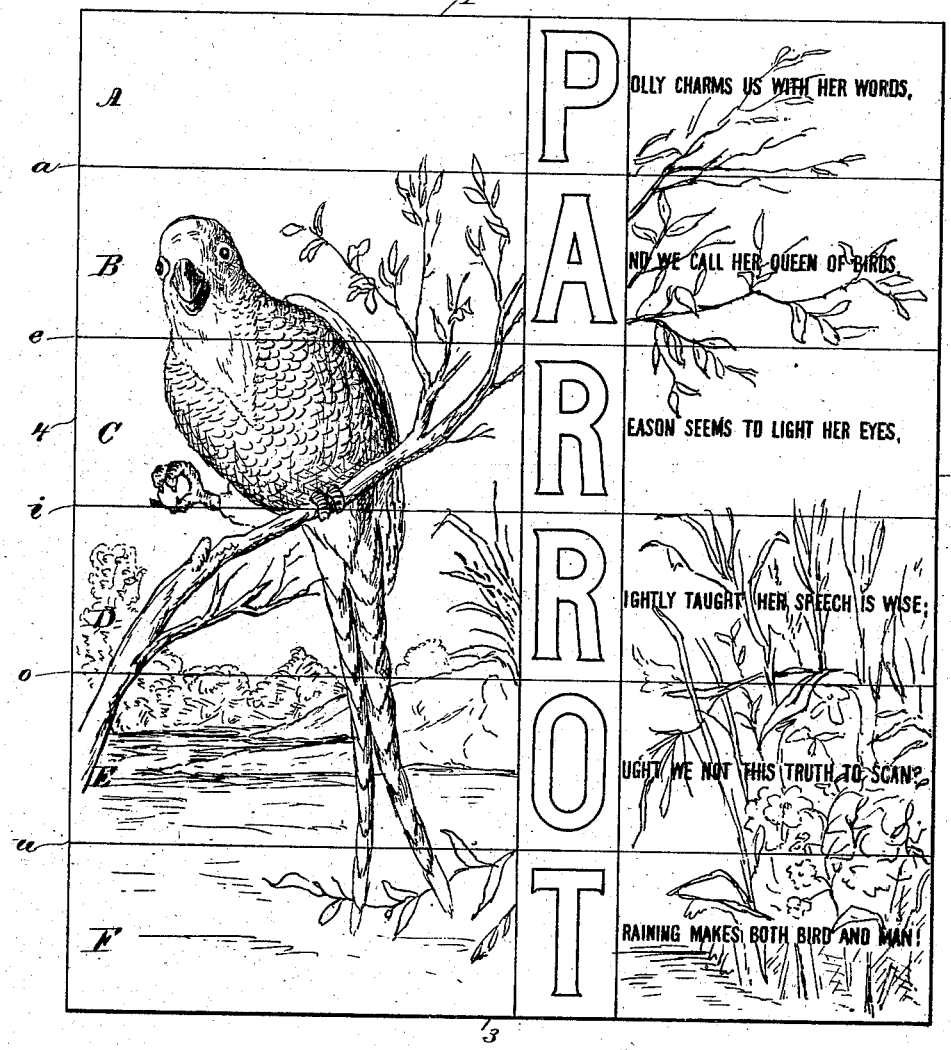
Attest:
Inventor
S. Lyman,

UNITED STATES PATENT OFFICE.

SEYMOUR LYMAN, OF WHITE PLAINS, NEW YORK.

PUZZLE-CARD FOR OBJECT-TEACHING.

SPECIFICATION forming part of Letters Patent No. 274,799, dated March 27, 1883.

Application filed July 20, 1880. (Model.)

*To all whom it may concern:*

Be it known that I, SEYMOUR LYMAN, a citizen of the United States, residing in the town of White Plains, county of Westchester, and State of New York, have invented certain new and useful Improvements in Puzzle-Cards for Object-Teaching, fully described and represented in the following specification and the accompanying drawing, forming a part of the same.

It is the purpose of this invention to provide for the use of young persons and children a card or sheet which comprises not only the elements of a puzzle, whereby a pleasing amusement is afforded in matching together the several parts composing a unitary subject, but means of instructing the mind through the much-approved method of object-teaching.

The invention consists in a card or sheet upon which are delineated a suitable object, the letters composing its name, and descriptive lines of which the letters of the name form such a part as to constitute an acrostic verse, said card or sheet being divided into a number of separable parts or sections, each of which bears a portion of the object represented—one letter of its name and one line of the acrostic verse—as will be hereinafter more particularly described and claimed.

In carrying out this invention a proper subject, as a bird, animal, or the like object—such, for instance, as the parrot illustrated on the accompanying drawing—is delineated by means of printing, painting, or drawing a representation thereof upon a sheet of thick paper card-board, tin, thin wood, or the like appropriate material. The letters composing the name of the object are likewise delineated in such manner that the letters composing it shall form a vertical line across the face of the card or sheet, said name or vertical line of letters being disposed so as to present a space at the right adapted to receive words forming lines of reading-matter, which may either be descriptive of the object or otherwise refer to or treat of the same, the first word of each of which lines has one of the letters composing the name of the object as its initial letter, so that the letters of the said name, together with those of the lines of reading-matter, form an acrostic verse. Thus, as shown in the drawing, the object—a parrot—is delineated upon the left hand of a card or sheet, the edges of which are represented by the lines 1 2 3 4, and near the center of such card or sheet the name "Parrot" is printed, so that its letters form a vertical line, while at the right-hand end of the card a line of reading-matter extends from each letter of the name of the object, one such letter being an integral part of each line, and all the lines combining to form an acrostic verse. The card thus made is cut horizontally upon lines, as *a e i o u*, so as to divide the same into as many parts or sections, A B C D E F, as there are letters in the name of the object, which lines *a e i o u* thus separate each line of the verse, and so divide the picture that when the sections of the card are packed or arranged indiscriminately the ingenuity will be taxed in rearranging them so as to restore the integrity of the picture and bring the parts of the name and verse into proper reading order, which manipulation renders the reading of the lines a useful help to the solution of the puzzle presented, and consequently imparts to the user the information each contains and instructs one concerning the object treated of.

The picture or object illustrated may of course be confined to one side of the card or sheet, or it may cover the whole extent of the same. The letters composing the name of the object may be disposed in an angular or stepped line, and may be the initial or terminal letters of the lines they in part form. The dividing cuts may be straight lines or irregular in form, and vary from the horizontal, and these lines may divide the said letters, instead of separate them, or the lines of words, if it is desired to make the puzzle more intricate.

While a single object is rendered the subject of illustration herein, it is to be understood that a multiple scene may be represented and described—as a group of animals or a house and its surroundings, the parts or sections of the cards varying in number, as may be desirable—without departing from the invention, which consists, essentially, in the combining of easy lessons taught by a vertical descriptive line and horizontal words formed in part thereby, constituting an acrostic, with illustrations of the objects to which the descriptive matter relates, upon a card that is divided into sections or parts, so as to constitute a puzzle.

This invention provides a cheap and efficient means of not only teaching useful lessons to the young, but a vehicle for the same that appeals to the mind by its amusing form, and thus educates without becoming an oppressive task.

Having thus described my invention, what I claim is—

1. A puzzle or object-lesson card bearing upon it a picture of the object treated of and a vertical line of letters, each of which, in part, forms a horizontal line of words relating to the object and constituting an acrostic, which card is severed horizontally into many separable parts or divisions, substantially as described.

2. A puzzle or object-lesson card having upon it a picture of the object treated of and the name of said object and certain matter relating thereto, so arranged as to form an acrostic, said card being severed into many separable parts, substantially as described.

In testimony whereof I have hereunto set my hand in the presence of two subscribing witnesses.

SEYMOUR LYMAN.

Witnesses:
H. T. MUNSON,
T. H. PALMER.